(12) United States Patent
Oda et al.

(10) Patent No.: US 8,488,569 B2
(45) Date of Patent: Jul. 16, 2013

(54) COMMUNICATION DEVICE

(75) Inventors: Sotaro Oda, Kawasaki (JP); Atsushi Kitada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1770 days.

(21) Appl. No.: 11/159,807

(22) Filed: Jun. 23, 2005

(65) Prior Publication Data

US 2005/0286503 A1 Dec. 29, 2005

Related U.S. Application Data

(63) Continuation of application No. PCT/JP03/06609, filed on May 27, 2003.

(51) Int. Cl.
*H04L 12/28* (2006.01)

(52) U.S. Cl.
USPC .................. 370/338; 370/356; 370/389

(58) Field of Classification Search
USPC .......... 370/310–314, 395.1–395.72, 351–356
See application file for complete search history.

(56) References Cited

U.S. PATENT DOCUMENTS

| | | | | |
|---|---|---|---|---|
| 6,567,851 | B1 * | 5/2003 | Kobayashi | 709/228 |
| 7,350,077 | B2 * | 3/2008 | Meier et al. | 713/171 |
| 2003/0037163 | A1 * | 2/2003 | Kitada et al. | 709/236 |
| 2003/0065799 | A1 * | 4/2003 | Kitamura | 709/230 |
| 2003/0202486 | A1 * | 10/2003 | Anton et al. | 370/329 |
| 2004/0122956 | A1 * | 6/2004 | Myers et al. | 709/228 |

FOREIGN PATENT DOCUMENTS

| | | |
|---|---|---|
| JP | 2000-332813 | 11/2000 |
| JP | 2001-045058 | 2/2001 |
| JP | 2002-064523 | 2/2002 |
| JP | 2002-217998 | 8/2002 |

OTHER PUBLICATIONS

International Search Report dated Sep. 9, 2003.

* cited by examiner

*Primary Examiner* — Melanie Jagannathan
(74) *Attorney, Agent, or Firm* — Fujitsu Patent Center

(57) ABSTRACT

A communication device of the present invention performs communication over a network where a session is identified based on a source address set in a frame. The communication device comprises an interface unit for connecting to the network, a management unit for managing a plurality of addresses, a request unit for transmitting a frame including a session establishment request to an authenticator system provided on the network through said interface unit, and an address setting unit for setting one of the plurality of addresses managed by said management unit as a source address of the frame including the session establishment request.

10 Claims, 22 Drawing Sheets

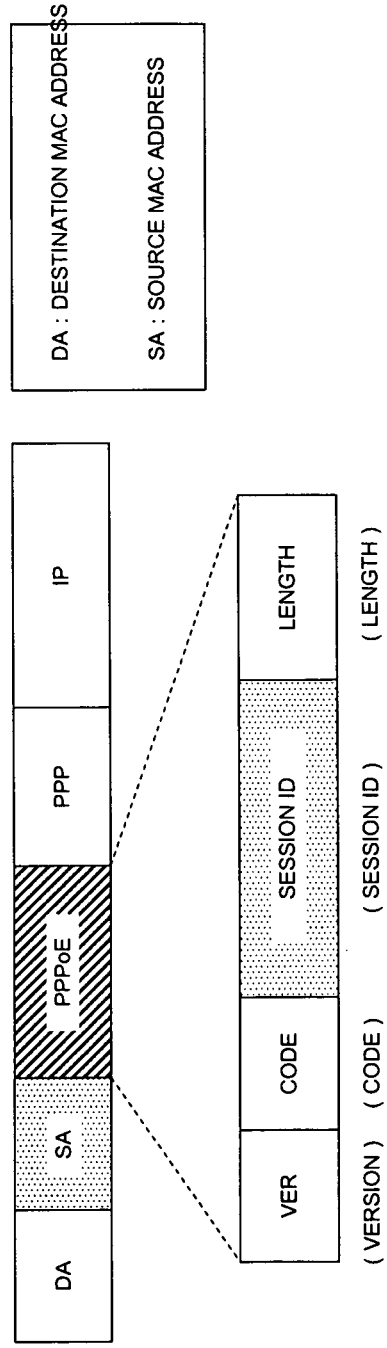
F I G . 2

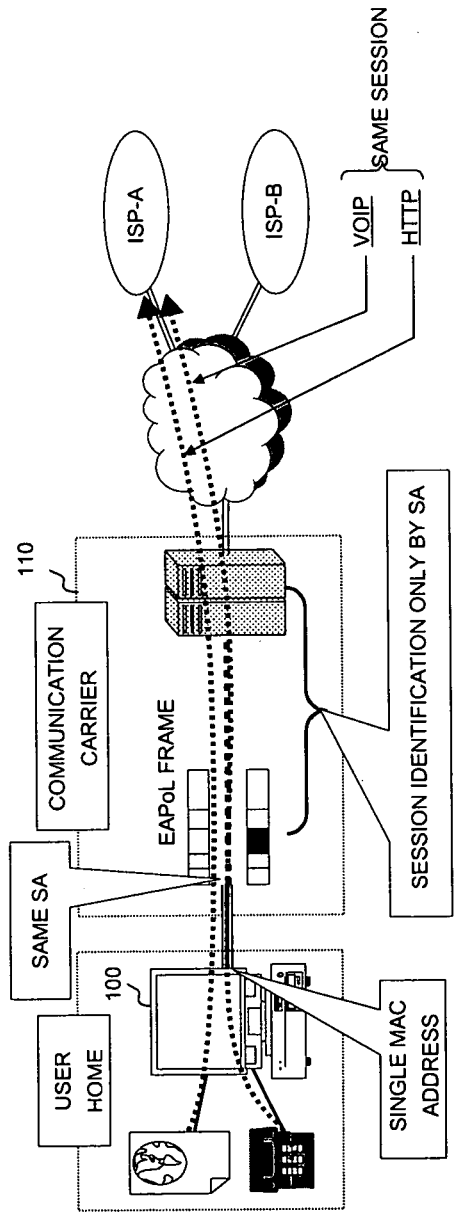
F I G. 6

| ASSIGNMENT CONDITION | SESSION ID | LOGICAL PORT ID | MAC ADDRESS | VALID/INVALID INDICATOR | SESSION ESTABLISHMENT |
|---|---|---|---|---|---|
| CONDITION 1 | 0 | 0 | a0-b0-c0-d0-e0-f0 | 1 | 1 |
| CONDITION 2 | 1 | 1 | a1-b1-c1-d1-e1-f1 | 1 | 0 |
| CONDITION 3 | 2 | 3 | a2-b2-c2-d2-e2-f2 | 1 | 0 |
| CONDITION 4 | 3 | 0 | 0 | 0 | 0 |
| CONDITION 5 | 0 | 0 | 0 | 0 | 0 |
| CONDITION 6 | 0 | 0 | 0 | | 0 |

| ASSIGNMENT CONDITION | SESSION ID | LOGICAL PORT ID | MAC ADDRESS | VALID/INVALID INDICATOR | SESSION ESTABLISHMENT |
|---|---|---|---|---|---|
| (-1) | 0 | (-1) | a0-b0-c0-d0-e0-f0 | 1 | 0 |
| (-1) | 1 | (-1) | a1-b1-c1-d1-e1-f1 | 1 | 0 |
| (-1) | 2 | (-1) | a2-b2-c2-d2-e2-f2 | 1 | 0 |
| (-1) | 3 | (-1) | (-1) | 0 | 0 |
| (-1) | 0 | (-1) | (-1) | 0 | 0 |
| (-1) | 0 | (-1) | (-1) | 0 | 0 |

FIG. 13B

| ASSIGNMENT CONDITION | SESSION ID | LOGICAL PORT ID | MAC ADDRESS | VALID/INVALID INDICATOR | SESSION ESTABLISHMENT |
|---|---|---|---|---|---|
| 80 | 0 | 0 | a0-b0-c0-d0-e0-f0 | 1 | 1 |
| (-1) | 1 | (-1) | a1-b1-c1-d1-e1-f1 | 1 | 0 |
| (-1) | 2 | (-1) | a2-b2-c2-d2-e2-f2 | 1 | 0 |
| (-1) | 3 | (-1) | (-1) | 0 | 0 |
| (-1) | 0 | (-1) | (-1) | 0 | 0 |
| (-1) | 0 | (-1) | (-1) | 0 | 0 |

FIG. 13C

| ASSIGNMENT CONDITION | SESSION ID | LOGICAL PORT ID | MAC ADDRESS | VALID/INVALID INDICATOR | SESSION ESTABLISHMENT |
|---|---|---|---|---|---|
| 80 | 0 | 0 | a0-b0-c0-d0-e0-f0 | 1 | 1 |
| 25 | 1 | 1 | a1-b1-c1-d1-e1-f1 | 1 | 1 |
| (-1) | 2 | (-1) | a2-b2-c2-d2-e2-f2 | 1 | 0 |
| (-1) | 3 | (-1) | (-1) | 0 | 0 |
| (-1) | 0 | (-1) | (-1) | 0 | 0 |
| (-1) | 0 | (-1) | (-1) | 0 | 0 |

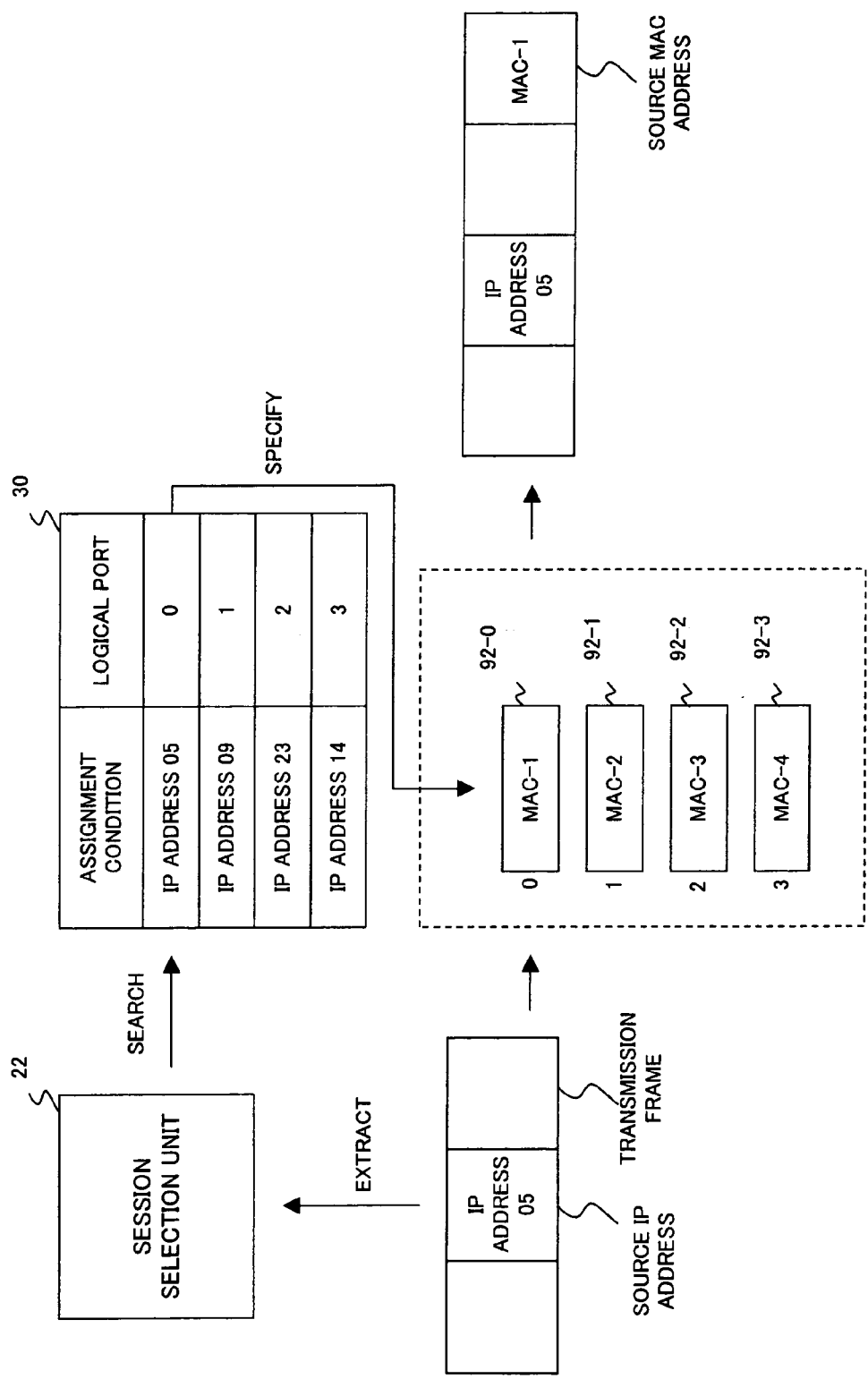
F I G. 20

COMMUNICATION DEVICE

CROSS-REFERENCE TO RELATED APPLICATION

This application is a continuation of an International application PCT/JP2003/006609, which was filed on May 27, 2003, currently pending, the contents of which are herein wholly incorporated by reference.

BACKGROUND OF THE INVENTION

1. Field of the Invention

The present invention relates to a communication device for communicating over networks, and a method for establishing a session for the communication.

2. Description of the Related Art

As more and more networks use broadband, varieties of communication services provided through public networks such as the Internet has been increasing. Various service providers (xSP) have sprung up in every provided communication service.

Every service provider usually provides a particular service only to users, who previously established an account. Therefore, the service providers are required to authenticate the users requesting the connection. As typical user authenticator systems, PPPoE (Point to Point over Ethernet) system and IEEE802.1x authenticator system are widely known. The Ethernet is, in fact, a registered trademark.

The PPPoE is a specification (RFC2516) for performing the link establishment procedures of PPP on the Ethernet frame, and comprises an authentication function for checking the user name and the password on the Ethernet. The PPPoE, currently, is widely prevalent as a method for user authentication and session management etc. in ADSL (Asymmetric Digital Subscriber Line) connection service or FTTH (Fiber to the Home) connection service provided by many of Internet service providers (ISP).

FIG. 1 is a diagram describing a configuration of communication system implementing the PPPoE. In FIG. 1, a user terminal 100 is connected to a service provider (ISP) 120 via a communications relay station 110. Here, the service provider 120 comprises a router device 121, a RADIUS (Remote Authentication Dial-In User Service) server 122, and various servers 123. The communications relay station 110 comprises a DSLAM (Digital Subscriber Line Access Multiplexer) 111, BRAS (Broadband Remote Access Server) 112 and so forth. The user terminal operates as a PPPoE client. The BRAS 112 is a subscriber management server, and operates as a PPPoE server. As one form of the BRAS 112, a device, holding several thousand to several ten thousand of users, is known for performing processes such as checking user names and passwords, connecting the signed users to a corresponding ISP and adjusting the bandwidth.

In the PPPoE, a session is identified using a source MAC address and a session ID set in each frame. Here, the PPPoE frame format is as it is shown in FIG. 2, and a session ID is stored in the PPPoE field. Therefore, in a communication by the PPPoE, it is possible even for a user terminal with only one MAC address to establish a plurality of sessions simultaneously by using a plurality of session IDs. Consequently, the user terminal 100, for example, can receive a plurality of services in parallel from a plurality of service providers as shown in FIG. 3. In the example shown in FIG. 3, a user receives HTTP (Hypertext Transfer Protocol) service from a service provider ISP-A while receiving VoIP (Voice over IP) service from a service provider ISP-B.

However, in the PPPoE, processing is slow because data is encapsulated in PPP during communication and an unnecessary header is added to each data frame. In addition, because traffic concentrates in BRAS of the communications relay station, loading of BRAS increases exponentially when many sessions exist at the same time. Additionally, there is a problem that the BRAS itself is costly.

For those reasons, in recent years, as PPPoE-alternative user authenticator system, IEEE802.1x has drawn a public attention. IEEE802.1x is the standard of a user authentication method, which judges accessibility of each port, and in particular, it is gaining in popularity for user authentication in a wireless LAN such as IEEE802.11b. The IEEE802.1x, unlike the PPPoE, does not encrypt communication data, and thus enables high-speed processing. The IEEE802.1x can also perform authentication by a layer 2 switch, which is relatively low price, and a proxy RADIUS server instead of a costly BRAS used in the PPPoE, therefore the whole system can be established at low cost.

FIG. 4 is an operation block diagram of the IEEE802.1x. Here, a system, allowing to use an EAP (Extensible Authentication Protocol), which is an extension protocol of PPP, on a LAN. Such system is referred to as EAPOL (EAP over LAN), and can support various authentication protocols.

In the above configuration, when a connection request is issued from an access request port (supplicant port access entity), an authenticator system determines authorization/unauthorization of the request in association with an authentication server. Then, it rejects the communication from a port, which failed the authentication, and only communication from a port, which succeeded the authentication, is authorized. Currently, a number of authenticator systems implement a function for performing the user authentication using a MAC address of the access request port. And by the authenticated MAC address, each communication can be identified.

As for PPPoE, the following Patent Documents 1 and 2 have descriptions. Patent Document 2 has a description of a system in which the PPPoE was replaced by the IEEE802.1x.

Patent Document 1: Japanese unexamined patent publication bulletin No. 2002-217998 (FIG. 1, FIG. 3, paragraphs 0003-0025)

Patent Document 2: Japanese unexamined patent publication bulletin No. 2003-60675 (paragraphs 0008-0046, 0071-0073)

As explained above, the IEEE802.1x has some advantageous effects compared with the PPPoE. However, the IEEE802.1x cannot establish a plurality of sessions simultaneously. That is because "session ID" does not exist in a frame used in the IEEE802.1x (EAPOL frame in this description), as shown in FIG. 5. The network side identifies a session based only on the source MAC address set in each frame.

In this manner, with the IEEE802.1x, because a session is identified according to only the source MAC address of each frame, a plurality of sessions cannot be established simultaneously to a single network interface (a physical port). Commonly used terminals comprise only one network interface (physical port). Therefore, in a system using the IEEE802.1x, users cannot enjoy a multi-session environment as shown in FIG. 3. An example of the existing communication mode in a system performing user authentication with the use of the IEEE802.1x is described in FIG. 6.

SUMMARY OF THE INVENTION

It is an object of the present invention to realize multi-sessions using a communication protocol with light load to the authenticator system. Specifically, it is to realize multi-sessions with a protocol (IEEE802.1x, for example) identifying a session by the source address of each frame.

The communication device of the present invention performs communication over a network where a session is identified based on a source address set in the frame, and comprises an interface unit for connecting the network, a management unit for managing a plurality of addresses, an establishment request unit for transmitting frames including a session establishment request to an authenticator system established on the network through the interface unit, and an address setting unit for setting one of the plurality of addresses managed by the management unit as the source address of the frame including the session establishment request.

In the present invention, the authenticator system receives the frame in which one of the plurality of addresses managed by the management unit is set, and determines whether the session establishment request stored in the frame is to be authorized or not. Afterward, the session authorized by the authenticator system is identified by the address set in the frame including the session establishment request. The communication device of the present invention has a plurality of addresses and can selectively use those addresses as required. Therefore, even if the interface unit is the only one network interface in the communication device, a plurality of sessions can be established at the same time.

Another aspect of the communication device of the present invention performs communication through a network where a session is identified based on a source address set in the frame, and comprises a physical port connecting to the network, a plurality of logical ports with a distinct MAC address, an analysis unit for analyzing a content of the transmission frame, and a selection unit for selecting one logical port among the plurality of logical ports based on an analysis result of the analysis unit. The logical port selected by the selection unit sets the address given to the logical port as the source address of the transmission frame, and transmits the frame to the network through the physical port.

In this invention, a logical port is selected for each transmission frame according to the content of the frame (source IP address, port number, for example). The selected logical port sets the address given to the logical port as the source address of the transmission frame, and transmits the frame to the network through a physical port. Here, the network identifies a session based on the source address set in the frame. Thus, the communication device of the present invention, though comprising only one physical port as a network interface, can perform communication utilizing a plurality of sessions at the same time by providing a plurality of logical ports.

BRIEF DESCRIPTION OF THE DRAWINGS

FIG. 2 shows a format of PPPoE frame;

FIG. 6 is an example of the conventional communication form in the system performing a user authentication using the IEEE802.1x;

FIG. 11 is an example of session management table;

FIG. 13A through FIG. 13C are practical examples of processing to update the session management table;

FIG. 19 and FIG. 20 are diagrams explaining a method for realizing logical ports;

DESCRIPTION OF THE PREFERRED EMBODIMENTS

In the following description, preferred embodiments of the present invention are set forth.

Figure 1:
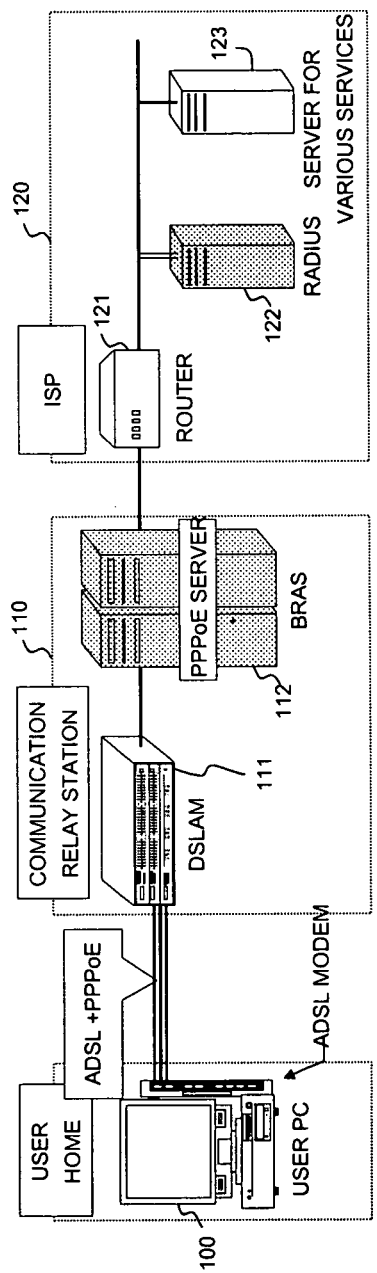
FIG. 1 is a configuration diagram of the communication system implementing the PPPoE.
Figure 3:
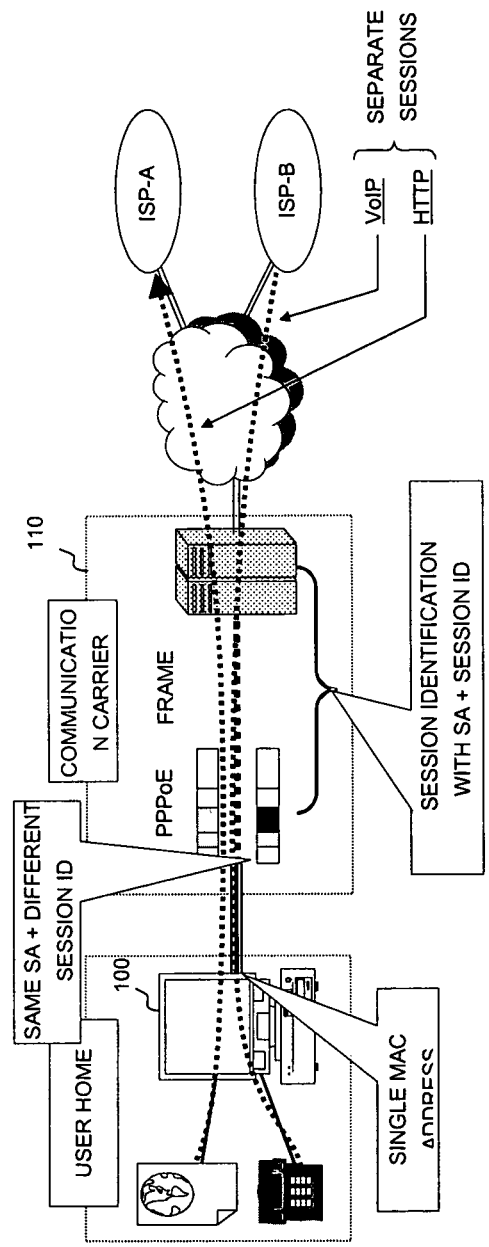
FIG. 3 describes an example of the utility of multi-session by the PPPoE.
Figure 4:
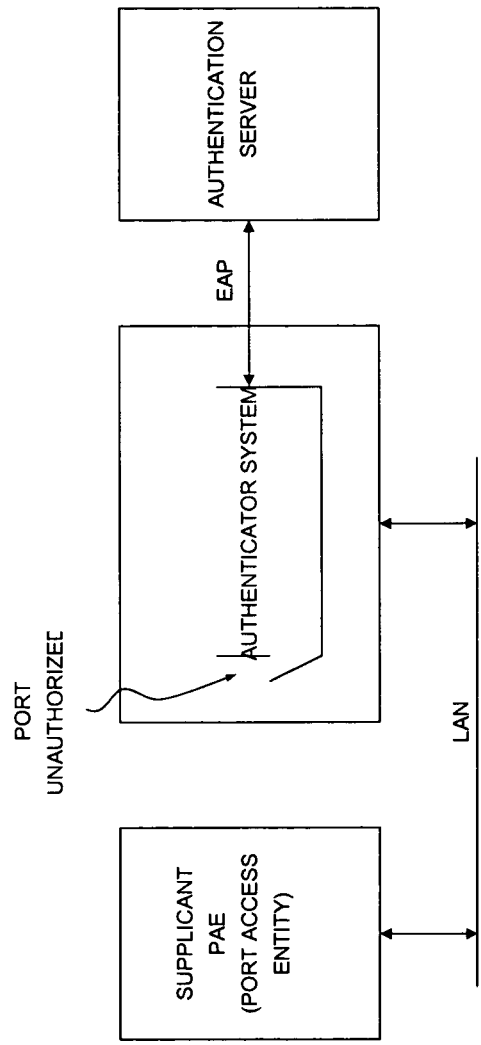
FIG. 4 is an operation block diagram of the IEEE802.1x.
Figure 5:
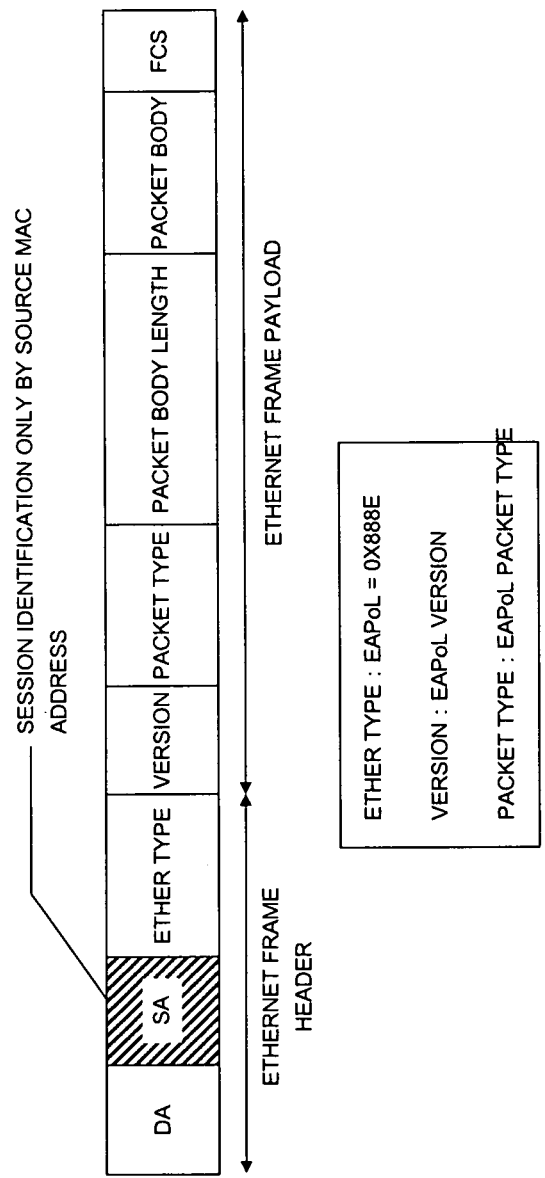
FIG. 5 shows a format of a frame used in the IEEE802.1x.
Figure 7:
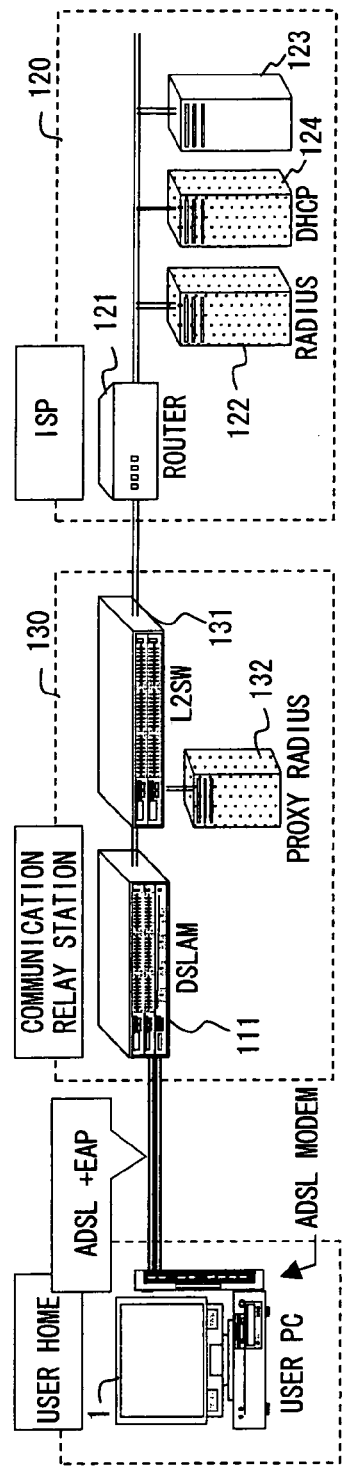
FIG. 7 is a configuration diagram of an example of network to which the communication device of the present invention is connected.

FIG. 7 shows a configuration of an example of a network to which the communication device (a terminal device in this description) of the present invention is connected. Here, when the numerical references used in FIG. 7 are the same as in the above-mentioned FIG. 1, the devices indicated by the numerical references are also the same as in FIG. 1.

A user terminal 1 is connected to a service provider (ISP) 120 through a communications relay station 130. Here, the service provider 120 comprises a router device 121, a RADIUS (Remote Authentication Dial-In User Service) server 122, a DHCP (Dynamic Host Configuration Protocol) server 124 and various servers 123 such as a content server. The router device 121 performs routing processing of packets. The RADIUS server 122 manages user information and performs user authentication using user names, passwords and so forth. Additionally, the DHCP server 124 assigns an IP addresses in response to a request from the user terminal 1.

The communications relay station 130 comprises a DSLAM (Digital Subscriber Line Access Multiplexer) 111, a layer-2 switch (L2SW) 131 and a proxy RADIUS server 132. The DSLAM 111 has a number of xDSL modems, and it multiplexes many digital subscriber lines. The layer-2 switch 131 transfers frames based on the MAC address. It should be noted that the layer-2 switch 131 supports the IEEE802.1x. In addition, the proxy RADIUS server 132 takes at least a part of the user authentication procedures as substitution for the RADIUS server 122.

In the above system, user authentication is basically carried out by the proxy RADIUS server 132 in the communications relay station 130, or by association of the proxy RADIUS server 132 with the RADIUS server 122. Here, the IEEE802.1x is used for the authentication protocol.

Figure 8:
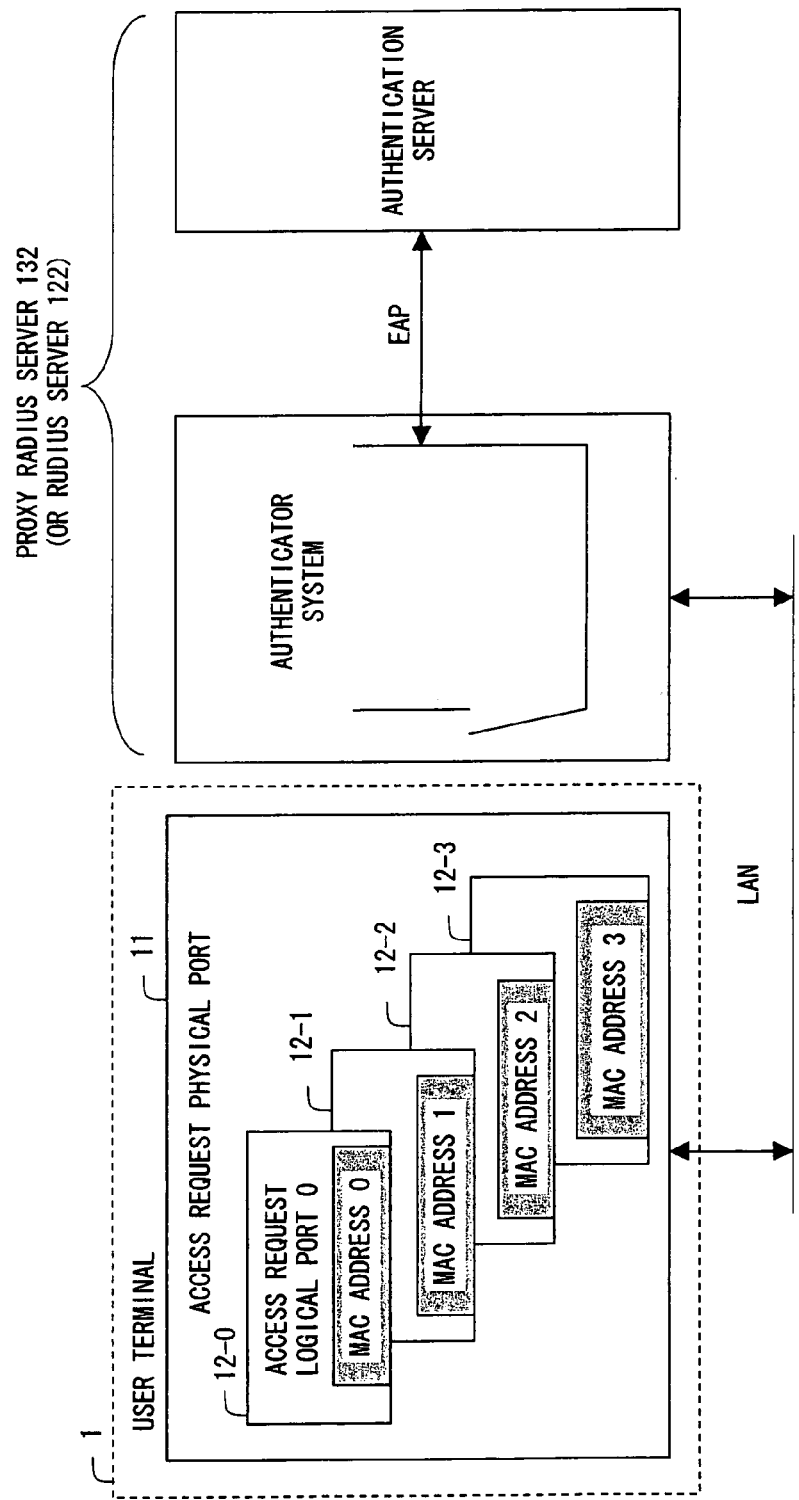
FIG. 8 explains a concept of the present invention.

FIG. 8 is a diagram explaining a concept of the present invention. Here, an access request physical port 11 is a communication port serving as a network interface comprised in the user terminal 1. It is assumed that the user terminal 1 comprises only one access request physical port 11. The authenticator system and the authentication server can be realized by, for example, the proxy RADIUS server 132 or the RADIUS server 122 shown in FIG. 7.

In general, in order for a terminal device to be connected to a plurality of service providers at the same time, a prerequisite number of sessions must be generated and retained. However, when the IEEE802.1x is used as the user authentication protocol, a session (IEEE802.1x session) is identified only by the source MAC address in the frame transmitted from the terminal device. Normally, only one MAC address is assigned to one communication port. Therefore, when a terminal device comprises only one communication port, the terminal device can retain only one session, and therefore, cannot be connected to a plurality of service providers at the same time.

Thus, in the present invention, a plurality of logical ports are provided to one physical port, and a distinct MAC address is assigned to each logical port. In the example shown in FIG. 8, a plurality of access request logical ports 12-0~12-3 are provided with respect to one access request physical port 11. To each of the access request logical port 12-0 through 12-3, MAC address-0 through MAC address-3 are assigned, respectively. In order to use these MAC addresses as globally unique addresses, they are required to be obtained from a communication port manufacturer, however when they are private addresses used in LAN etc., arbitrary values can be chosen.

The user terminal 1 comprises a function to retain a session for every logical port. When connecting to a different service provider, frames are sent out through a different logical port. At that time, a distinct MAC address is assigned to each logical port, and each of the logical ports inserts the MAC address, assigned to the logical port, as the source address of the frame to be sent. For example, when transmitting a frame through the access request logical port 12-0, "MAC address-0" is set as the source address of the frame, and when transmitting a frame through the access request logical port 12-1, "MAC address-1" is set as the source address of the frame.

Therefore, for the authenticator system, it seems that a plurality of client devices are connected, although what is actually connected is the only one user terminal. In other words, when the IEEE802.1x is used as the authentication protocol, multi-sessions can be realized with a single user terminal.

Figure 9:
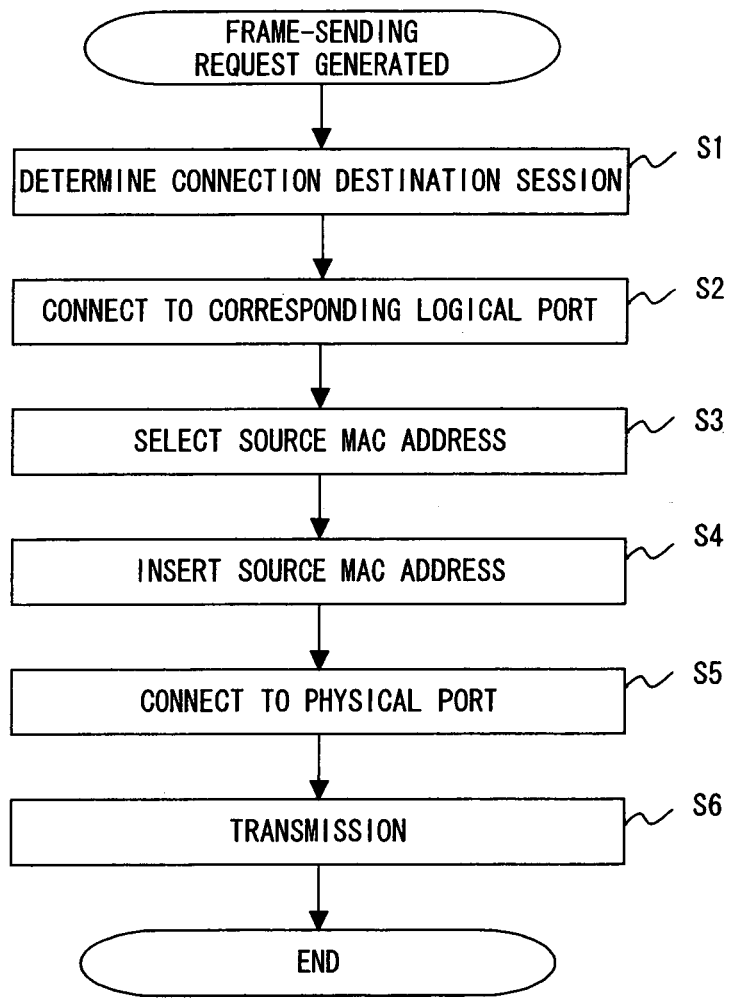
FIG. 9 is a flowchart describing an outline operation of frame transmission.

FIG. 9 is a flowchart showing an operation outline of the user terminal 1 sending out frames. The chart describes the operations after frame-sending request is generated by upper layer software.

In the step S1, a session of the connection destination is determined. Here, a session of the connection destination is determined by analyzing payloads of the frame to be sent, for example. In the step S2, a logical port corresponding to the determined session is detected, and the frame to be sent is fed to the detected logical port. In the step S3, a MAC address corresponding to the determined session is detected. If the MAC addresses corresponding to each of the logical ports are fixedly assigned, processing in the step S2 and that in the step S3 are practically carried out as one processing.

In the step S4, the MAC address detected in the step S3 is inserted as the source MAC address of the frame to be sent. This processing is carried out by, for example, the logical port detected in the step S2. A connection to a physical port is established in the step S5. And in the step S6, the frame is sent out to a network.

In this way, the user terminal 1, after determining the session of the connection destination, sends out the frame with a MAC address corresponding to the session as a source MAC address to a network. Then a communication device on the network identifies the session based on the source MAC address of the frame, and transfers the frame to a device corresponding to the identified session. At that time, the user terminal 1 comprises a plurality of logical ports, and is able to use a plurality of MAC addresses. The communication device on the network identifies the session for each MAC address. As a result, multi-session can be realized. In other words, the user terminal 1 can be connected to a plurality of service providers simultaneously even with a configuration comprising only a single communication port.

Figure 10:
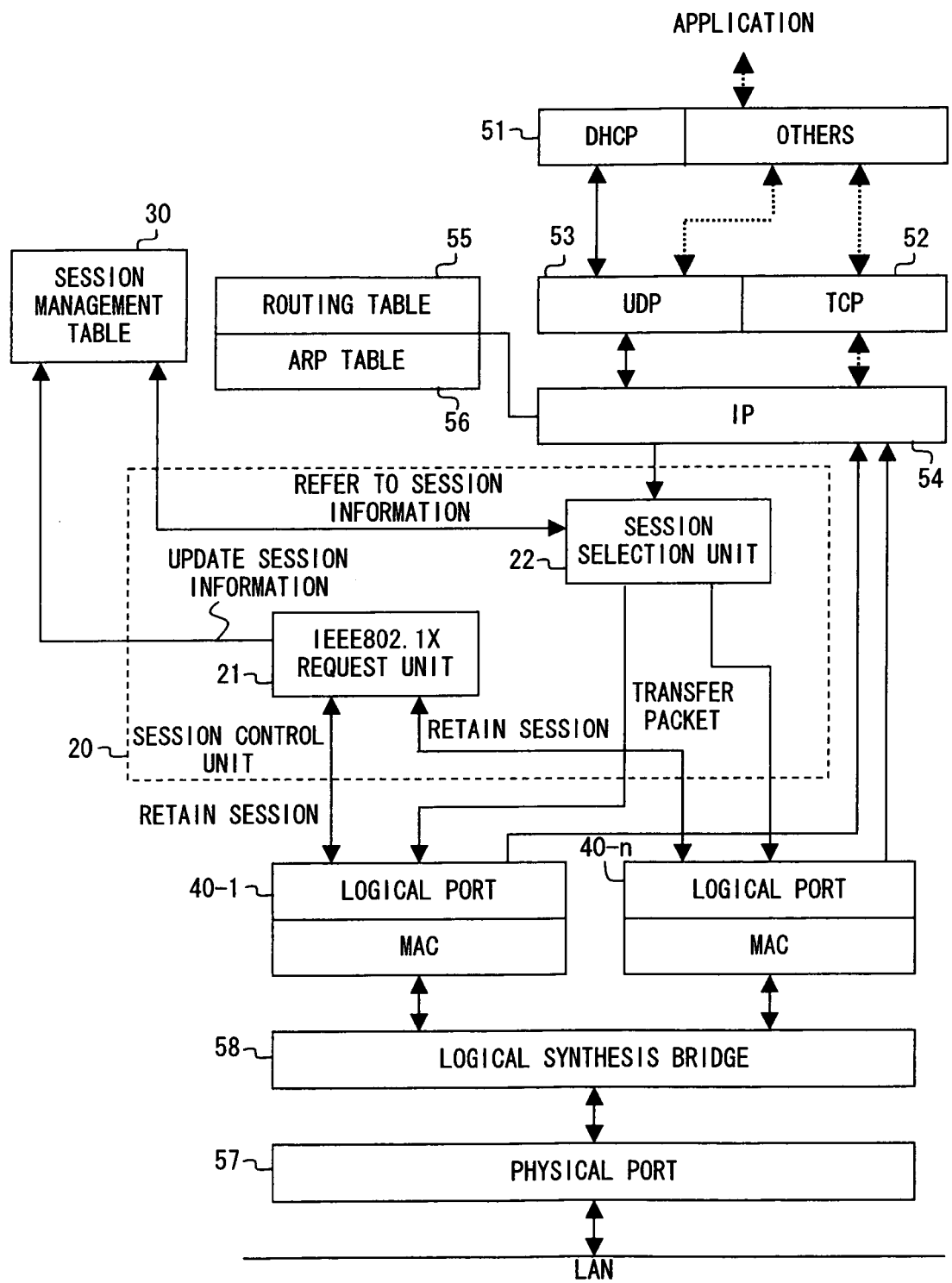
FIG. 10 is a block diagram of user terminal.

FIG. 10 is a block diagram of the user terminal 1. This drawing mainly describes a block diagram of the part for performing communication processing (especially the part for operating as the IEEE802.1x client).

A characteristic feature of the user terminal 1 is to comprise a session control unit 20, a session management table 30 and a plurality of logical ports 40-1 through 40-n, and the other parts can be realizable by the conventional art. A DHCP client unit 51 acquires an IP address from a DHCP server. A TCP processing unit 52 and a UDP processing unit 53 perform packet assembly/disassembly according to the TCP and the UDP, respectively. An IP processing unit 54, comprising a routing table 55 and an ARP (Address Resolution Protocol) table 56, performs routing processing etc.

A physical port 57 is an interface with the network, and a communication line is connected to the port. A logic synthesis bridge 58 operates as a buffer when sending out frames. In addition, the logic synthesis bridge 58 analyzes a MAC address of a frame received from the network through the physical port 57, and performs transfer processing of the frame to the corresponding logical port.

The session control unit 20 transfers the frames generated in the IP processing unit 54 to the logical port corresponding to a session to be established. An IEEE802.1x request unit 21 comprises a function for updating session information managed by the session management table 30 in addition to a function for performing session establishing procedures according to the IEEE802.1x. A session selection unit 22 analyzes the content of the frames generated by the IP processing unit 54, and refers to the session management table 30 with the analysis result as a search key. The session selection unit 22 transfers the frames generated in the IP processing unit 54 to the corresponding logical ports 40-1 through 40-n based on the reference result.

The session management table 30, explained later in details, stores session information for management of one or a plurality of session(s). Each of the logical ports 40-1 through 40-n is a logical communication port, and is assigned with a MAC address.

In the user terminal 1, as explained above, the logical ports 40-1 through 40-n are provided in between a protocol in the third layer (the IEEE802.1x, IP in this embodiment) of the OSI reference model and the physical port. A distinct MAC address is assigned to each of the logical ports 40-1 through 40-n. For that reason, from an upper protocol perspective (including applications), the logical ports 40-1 through 40-n operate as distinct network interfaces.

In initialization processing of a network interface, first the DHCP client unit 51 acquires an IP address for a logical port to be used. Next, the IP processing unit 54 initializes the routing table 54 and the ARP table 56. Additionally, the IEEE802.1x request unit 21 requests establishment of a session for communication carried out through the logical port to be used. When the establishment of the session is authorized, the IEEE802.1x request unit 21 writes the session information relating to the authorized session in the session management table 30. It is noted that the session establishment procedures, as stated later, conforms to the specification of the IEEE802.1x.

FIG. 11 is a practical example of the session management table 30. In FIG. 11, keywords for selecting a session by which a transmission frame should be transmitted are described in "assignment condition". For example, information specifying communication authorized by the authenticator system (communication conditions: source IP address, port number and so forth) is stored. "Session ID" is an identification number for identifying each session. However, the session ID is not the one defined in the IEEE802.1x, but is just used inside the user terminal 1.

"Logical port number" identifies a logical port to which the selected session is assigned. In "MAC address", a MAC address to be assigned to the established IEEE802.1x session is described.

"Valid/invalid indicator" indicates whether the registered MAC addresses are valid or invalid (valid: 1, invalid: 0). Also, "session establishment" indicates availability of each session (used: 1, available: 0).

Figure 12:
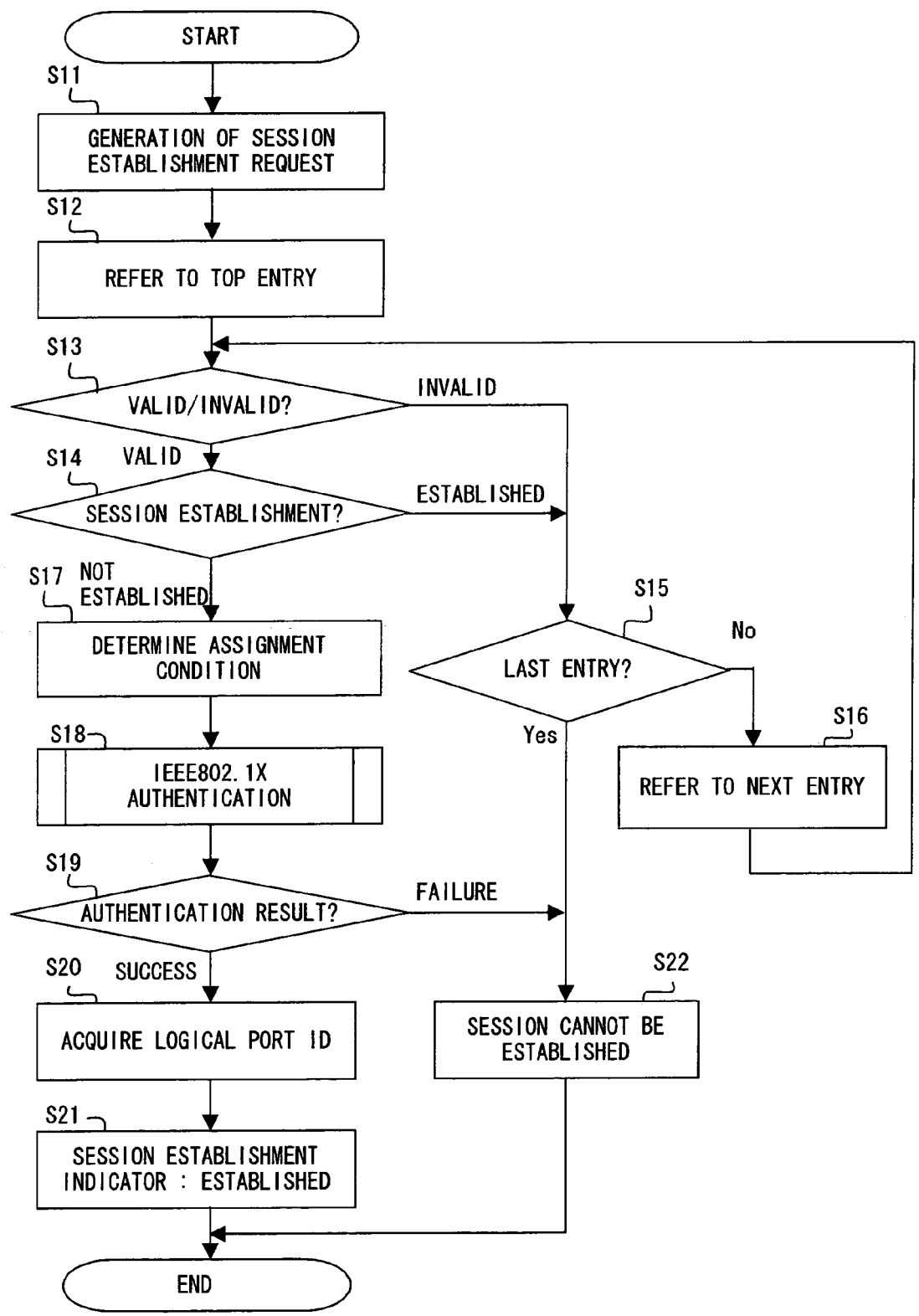
FIG. 12 is a flowchart showing processing for generation of session management table.

FIG. 12 is a flowchart indicating processing for generating the session management table 30. In this chart, the user terminal 1 initiates a new communication. When initiating the new communication, a session establishment request is generated by upper layer software.

When generation of a session establishment request is detected in the step S11, processing in the step S12 and after is carried out. In the steps S12 through S16, each entry of the session management table 30 is sequentially referred from the top, searching for an entry with a valid MAC address and with the session not established. In other words, the top entry is referred to in the step S12. Next, in the steps S13 and S14, "valid/invalid indicator" and "session establishment indicator" are examined, respectively. The steps S15 and S16 are processing for sequentially referring to the entries in the table. When an entry with a valid MAC address and with the session not established is not detected, it is determined in the step S22 that a new session cannot be established.

When an entry with a valid MAC address and with the session not established is detected, in the step S17, "assignment condition" relating to the session establishment request is set in the detected entry. In the step 18, the IEEE802.1x authentication is performed. The IEEE802.1x authentication itself is a known protocol. However, in this processing, a logical port is generated using a MAC address registered in an entry detected by the steps S12 through S16, and transmission/reception of messages for the user authentication is performed through the logical port. Thus, in the IEEE802.1x authentication, the MAC address registered in the entry is used as the source MAC address of the frames to be sent from the user terminal 1 to the authenticator system.

In the step S19, a result of the IEEE802.1x authentication is received from the authenticator system. When receiving a notification of success in the authentication, in the step S20, information for identifying the logical port used in the authentication procedures in the sep S18 is set in the "logical port ID" in the session management table 30. In addition, "session establishment indicator: used (established)" is set in the step S21. When receiving a notification of failure in the authentication, on the other hand, it is determined, in the step S22, that a new session cannot be established.

Next, with reference to FIG. 13A through FIG. 13C, procedures to update the session management table 30 in response to the establishment of a new session is explained. In this description, it is assumed, as shown in FIG. 13A, that the user terminal 1 can use three MAC addresses (a0b0c0d0e0f0, a1b1c1d1e1f1, a2b2c2d2e2f2). It is also assumed that any session has yet established at the present moment. Therefore, "0" is entered in "session establishment" of each entry. In addition, "−1" is entered in "assignment condition" and "logical port ID" of each entry as a value representing an unset setting.

A user starts browsing a homepage in this state. In such a case, the IEEE802.1x request unit 21, first, detects an entry, which has "valid/invalid indicator=1" and "session establishment indicator=0", from the session management table in FIG. 13A. Assume that the first entry is detected in this example. It is followed by input, as "assignment condition" of the entry, of a port number "80:http" corresponding to a protocol for browsing a homepage. Additionally, user authentication is requested to the authenticator system. At that time, the MAC address "a0b0c0d0e0f0" registered in the entry is set as the source MAC address of the frames, which is for sending a message relating to the IEEE802.1x authentication, to the authenticator system.

When the user authentication succeeds, a session is established. Then, "1" is entered in "session establishment indicator" and "logical port ID" is set in the entry. As a result, the session management table 30 is updated to the state described in FIG. 13B.

After this procedure, when the user sends an E-mail while holding the session relating to the http, the same session establishment procedure is taken. At this time, however, the MAC address "a1b1c1d1e1f1" registered in the second entry is used as the source MAC address of the frames, which is for sending a message relating to the IEEE802.1x authentication, to the authenticator system. Also, "25:smtp" is entered as "assignment condition" of the entry. As a result, the session management table 30 is updated as described in FIG. 13C. The session management table 30, as explained above, is able to manage a plurality of sessions present at the same moment.

Figure 14:
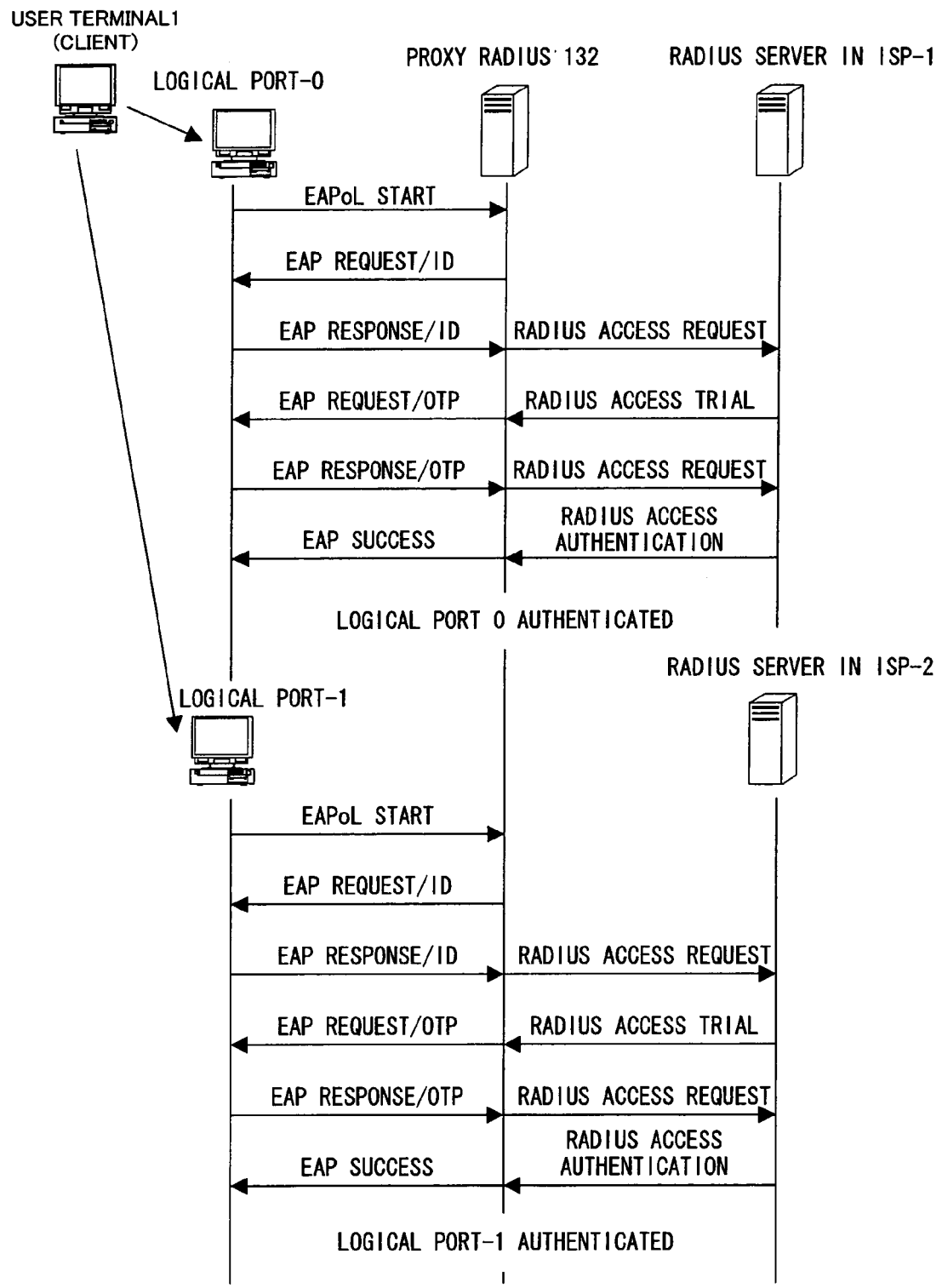
FIG. 14 describes message exchange in user authentication procedures.

FIG. 14 describes message exchange in the user authentication procedures. The procedures, basically, complies with specifications of the IEEE802.1x. And the processing is equivalent to the step S18 in FIG. 12.

The user terminal 1, when establishing the first session for the access to an ISP-1, for example, transmits/receives messages with the authenticator system (the proxy RADIUS server 132 and the corresponding RADIUS server in ISP-1) through the logical port-0.

When an EAPoL (Extensible Authentication Protocol over LAN) starting message is transmitted from the user terminal 1 to the authenticator system, the proxy RADIUS 132 requests a user ID using an EAP request message. When the user terminal 1 transmits the user ID in response, the proxy RADIUS server 132 and the RADIUS server check the user ID. The proxy RADIUS server 132, subsequently, requests a password (OTP: One Time Password), using the EAP request message. When the user terminal 1 transmits the password in response to the request, the proxy RADIUS server 132 and the RADIUS server check the password. When the authentication of the user ID and the password succeeds, the proxy Radius server 132 sends an EAP success message to the user terminal 1.

In the above authentication procedures, the user terminal 1 transmits the EAPOL starting message and an EAP response message to the proxy Radius server 132 through the logical port-0. For that reason, the MAC address assigned to the logical port-0 is used as the source MAC address of a Frame storing the messages. And the proxy RADIUS server 132 sets information for transferring the frame in which the MAC address is set as the source MAC address to the ISP-1 in the layer-2 switch 131.

Next, the user terminal 1, when establishing the second session for the access to an ISP-2, for example, transmits/receives messages with the authenticator system (the proxy RADIUS server 132 and the corresponding RADIUS server in ISP-2) through the logical port-1.

This procedure is basically the same as the procedure for establishment of the first session. However, at this time, the user terminal 1 transmits the EAPoL starting message and the EAP response message to the proxy RADIUS 132 through the logical port-1. For that reason, the MAC address assigned to the logical port-1 is used as the source MAC address of the frame storing the messages. And the proxy RADIUS 132 server sets information for transferring the frame in which the MAC address is set as the source MAC address to the ISP-2 in the layer-2 switch 131.

The operation of the authenticator system (the proxy RADIUS server 132, especially) complies with specifications of the IEEE802.1x, and it is not necessary to make a change for implementation of the present invention.

In the following description, procedures for transmitting frames utilizing the pre-established sessions.

Figure 15:
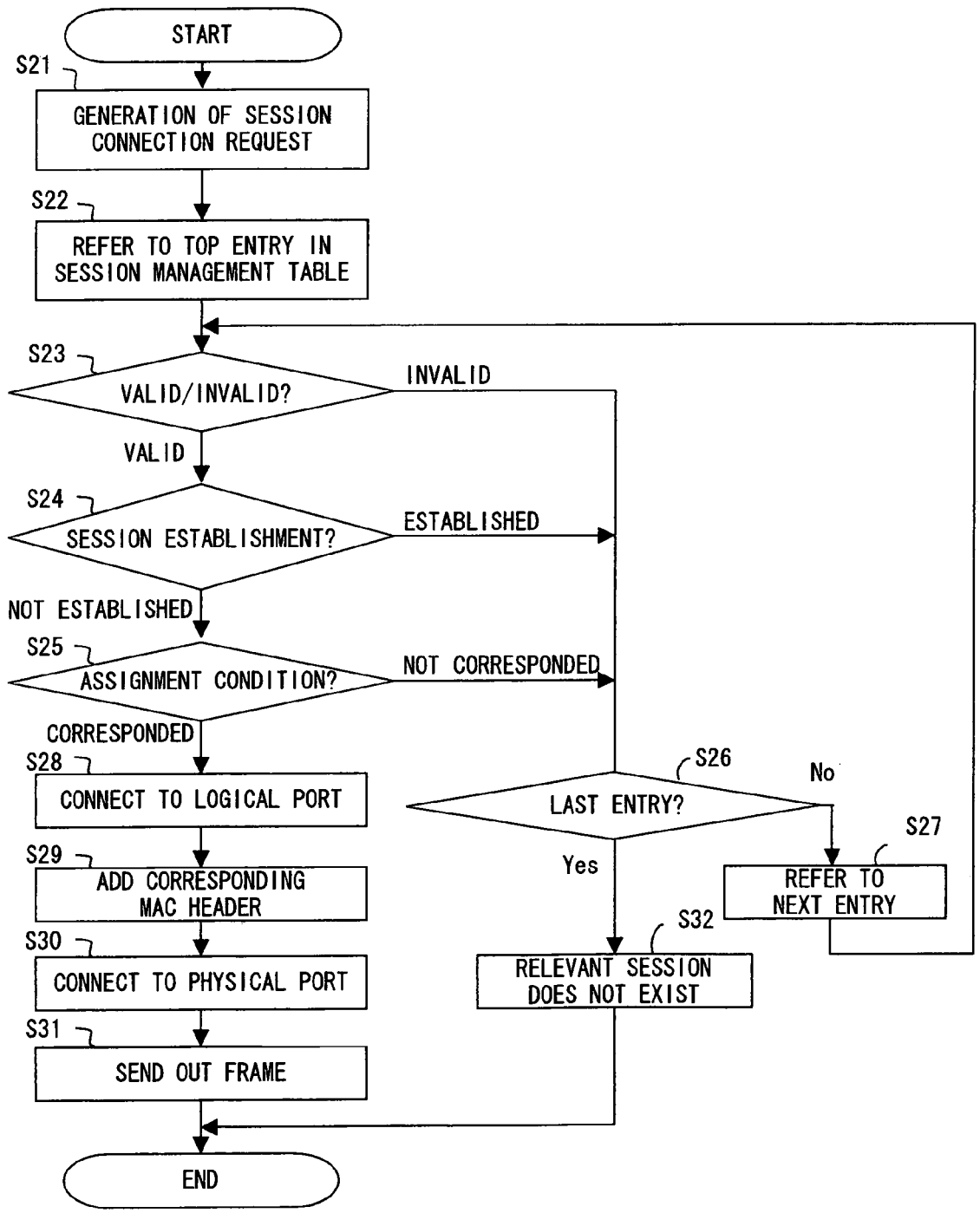
FIG. 15 is a flowchart showing processing for transmitting frames.

FIG. 15 is a flowchart in which processing for transmitting frames is shown. Here, it is assumed that session information relating to one or more of the session(s) has already registered in the session management table 30 by procedures explained with reference to the FIG. 12 and FIG. 13. Also, session connection request is generated by the upper layer software. In the following description, "Session connection" means transmission/reception of frames utilizing the pre-established session, whereas "session establishment" means establishment of a new session.

When generation of session connection request is detected in the step S21, processing following the step S21 is performed. In the steps S22 through S27, an entry, with a valid MAC address, with a session pre-established and with its assignment condition satisfied is searched by sequentially referring to each entry from the top in the session management table 30. Here, processing in the steps S23, S24, S26 and S27 are basically the same as the steps S13, S14, S16 and S17 shown in FIG. 12, and thus their explanations are omitted.

Figure 16:
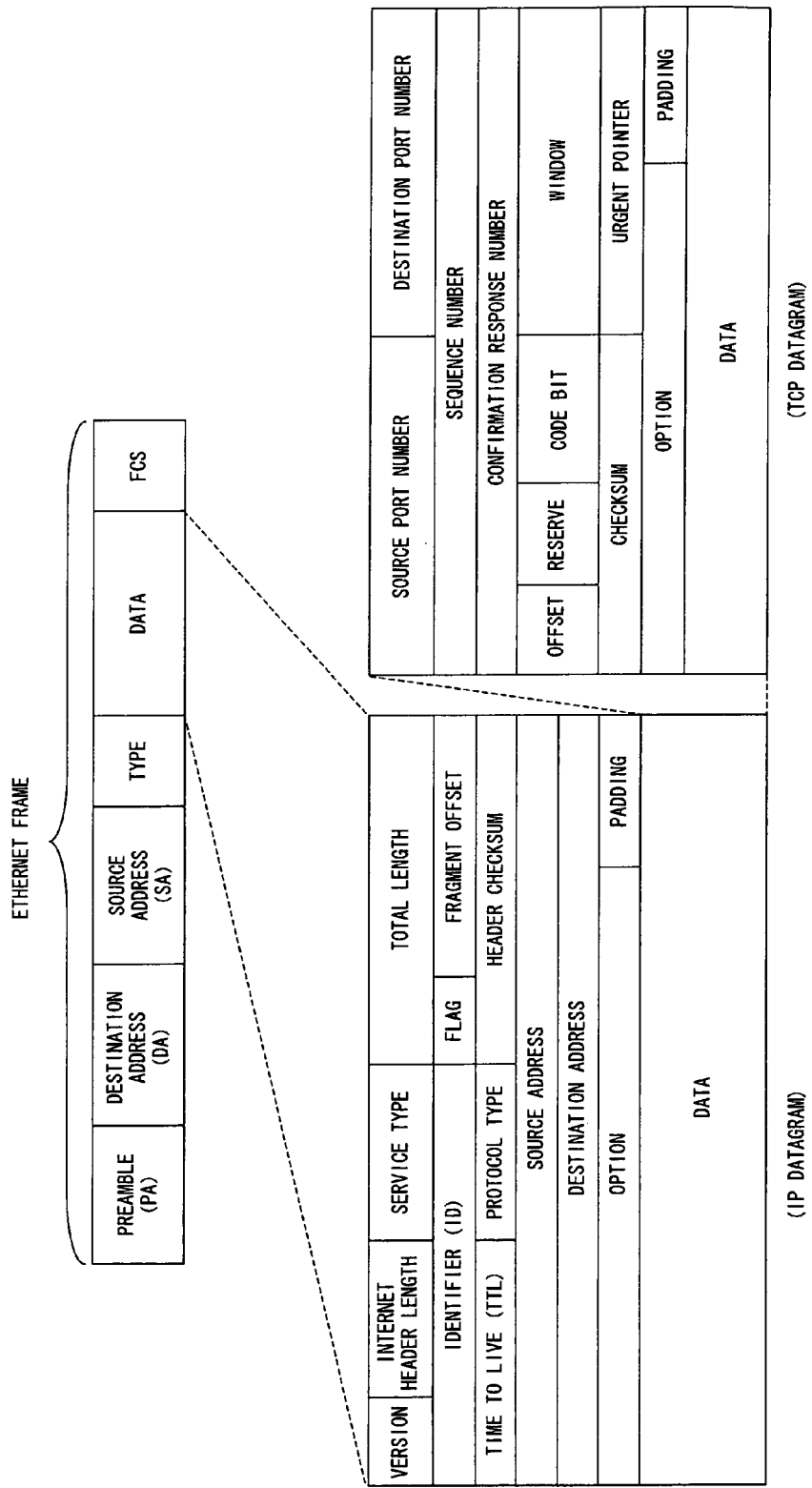
FIG. 16 describes a format of an example of the transmission frame.

In the step S25, contents of the transmission frames are analyzed and are checked whether or not assignment condition is satisfied. In this example, the transmission frame is, for example, in a format shown in FIG. 16. That is, IP datagram is stored in the payload of the Ethernet, and in the data field of the IP datagram stored is TCP datagram. When "source IP address" is set as "assignment condition", "source IP address" set in the header of the IP datagram is extracted, and whether or not the same address as the extracted address is registered in the session management table 30 is examined. Or, when "port number" is set as "assignment condition", "source port number or destination port number" set in the header of the TCP datagram is extracted, and whether or not the same port number as the extracted port number is registered in the session management table 30 is examined.

When an entry with a valid MAC address, with a pre-established session and with its assignment condition satisfied is detected, in the step S28, transmission frames are fed to a logical port corresponding to the detected entry. If the relevant entry is not detected, in the step S32, connection request is rejected. In the step S29, a MAC header is added to the transmission frame. This processing is carried out by the logical port. This processing can be merely an insertion of the source MAC address.

In the step S30, a transmission frame with the MAC header added is fed to the physical port. Then in the step S31, the transmission frame is sent out.

As described above, the user terminal 1 refers to the session management table 30 every time a frame is transmitted, and detects a session corresponding to the frame. And the frame is sent out to a network through the logical port corresponding to the extracted session. Therefore, a MAC address corresponding to the session to be connected is set as the source address of the transmission frame.

Consequently, in a network where sessions are identified based on the source MAC address of the frame, the user terminal 1 can simultaneously establish a plurality of sessions using a single physical port. That is to say, multi-sessions can be achieved.

Figure 17:
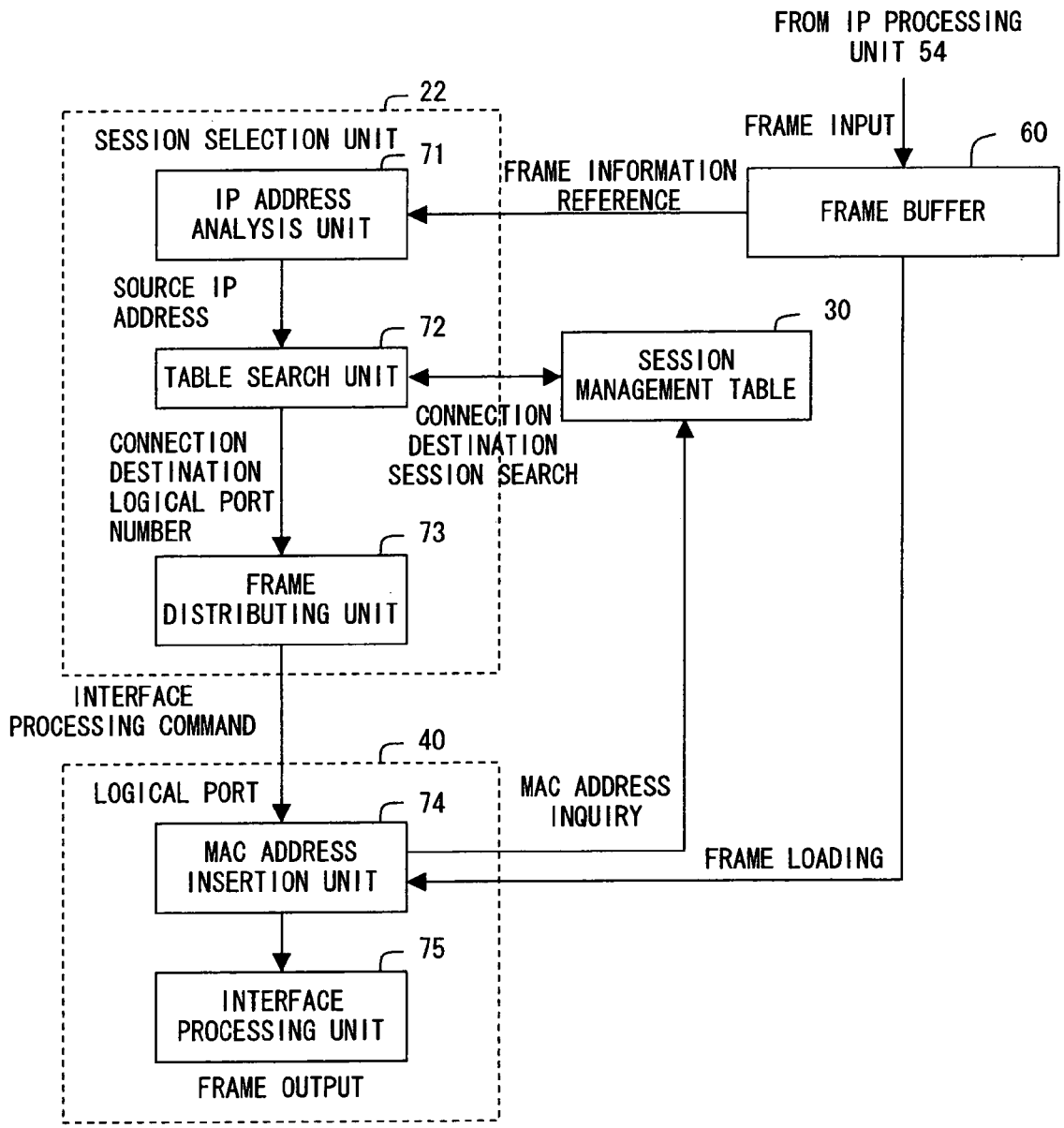
FIG. 17 and FIG. 18 are diagrams explaining a method for setting source MAC address in transmission frame.

FIG. 17 is a diagram explaining a method of setting a source MAC address to a transmission frame. In this diagram, a session is selected based on the IP address of the transmission frame. In other words, in this example, the source IP address authorized in the user authentication is registered as assignment condition in the session management table 30.

The transmission frame output from the IP processing unit 54 is temporarily stored in a frame buffer 60. The IP address analyzing unit 71 extracts the source IP address of the transmission frame stored in the frame buffer 60. The source IP address is stored, for example, in the header of the IP datagram shown in FIG. 16. Next, the table search unit 72 detects an entry in which the same address as the IP address extracted by the IP address analyzing unit 71 is registered as "assignment condition". Further, a frame distributing unit 73 gives an interface processing command to the logical port registered in the entry detected by the table search unit 72.

A MAC address insertion unit 74 of the logical port, which received the interface processing command, refers to the session management table 30 for the MAC address assigned to the relevant port. Then the MAC address insertion unit 74 obtains the transmission frame from the frame buffer 60, and stores the MAC address acquired from the session management table 30 in the source address field of the frame. An interface processing unit 75 sends out the transmission frame to a network through the physical port after re-calculation of FCS (Frame Check Sequence).

In such a way, in this embodiment, a MAC address, which is uniquely determined based on the IP address of the transmission frame, is set as the source MAC address of the transmission frame.

Figure 18:
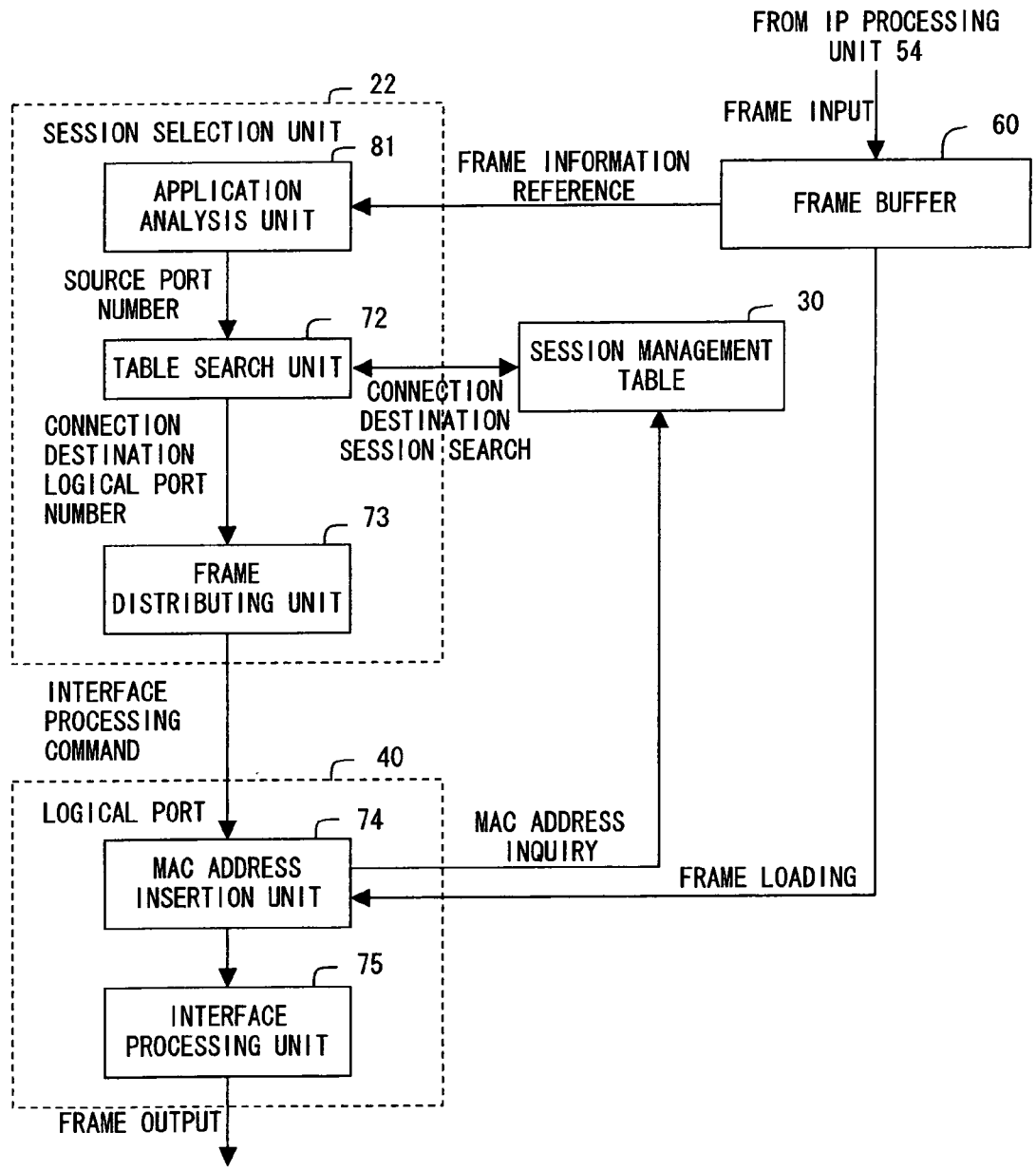

FIG. 18 is a diagram explaining another method for setting the source MAC address of the transmission frame. In this diagram, a session is selected based on a port number of the transmission frame. In other words, a port number authorized in the user authentication as "assignment condition" is registered in the session management table 30.

Configurations and operations of the session selection unit 22 and the logical port 40 are basically the same as in the example shown in FIG. 17. However, an application analysis unit 81 comprised as a substitution for the IP address analysis unit 71 extracts the port number of the transmission frame stored in the frame buffer 60. Here, the port number is, for example, stored in the header of the TCP datagram in FIG. 16. The table search unit 72 detects an entry in which the same port number as the port number extracted by the application analysis unit 81 is registered as "assignment condition".

In such manner, in the present embodiment, a MAC address uniquely determined based on the TCP port number of the transmission frame is set as the source MAC address of the transmission frame.

Figure 19:
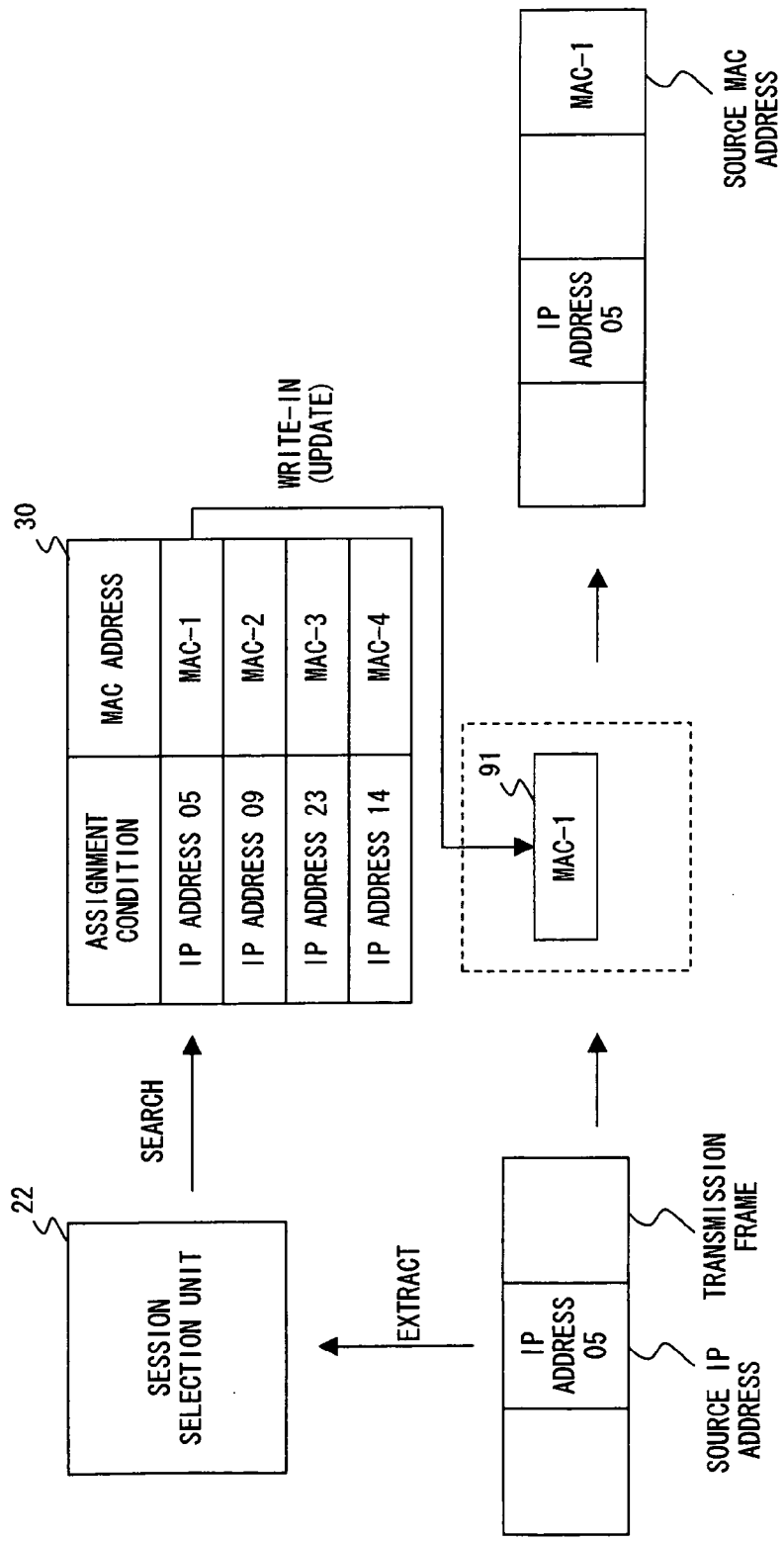

FIG. 19 and FIG. 20 are diagrams explaining a method for realizing the logical ports. An example in FIG. 19 comprises a register 91 for retaining a MAC address. When a transmission frame is generated by the IP processing unit 54, a MAC address corresponding to the source IP address of the frame is obtained from the session management table 30, and the MAC address is written in the register 91. The MAC address retained in the register 91 is written in the source MAC address field of the transmission frame.

As just explained, in the present example, a plurality of logical ports are realized by updating the MAC address in the register 91 according to the source IP address. Therefore, in the present example, a register for retaining the MAC address in the physical port can be used as the register 91 shown in FIG. 19. However, in such a case, either a software program or a hardware circuit is required for updating the register 91.

An example shown in FIG. 20 comprises a plurality of registers 92-0 through 92-3 for retaining MAC address. A plurality of MAC addresses assigned to the user terminal 1 are written in each of the register 92-0 through 92-3 in advance. In the session management table 30, information for identifying the registers 92-0 through 92-3 is registered as the logical port ID.

When a transmission frame is generated by the IP processing unit 54, the logical port ID corresponding to the source IP address of the transmission frame is obtained from the session management table 30, and a register identified by the logical port ID is specified. The register 92-0 is specified in the example of FIG. 20. Then the MAC address retained in the register 92-0 is written in the source MAC address field of the transmission frame.

As explained above, in the present example, a plurality of logical ports are realized by selecting a register retaining the distinct MAC address among a plurality of registers according to the source IP address.

Figure 21:
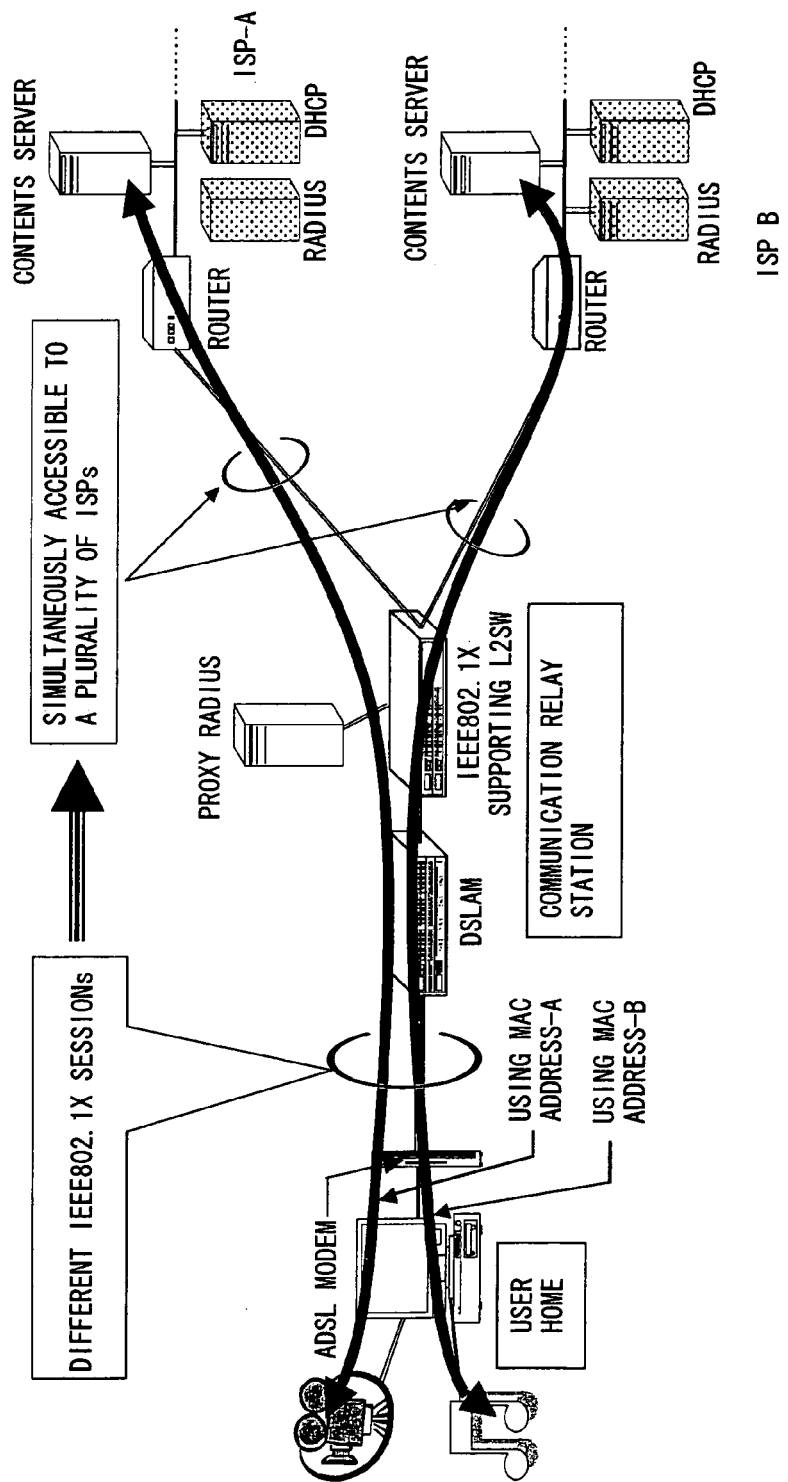
FIG. 21 is a practical example of communication using the communication device of the present invention.
Figure 22:
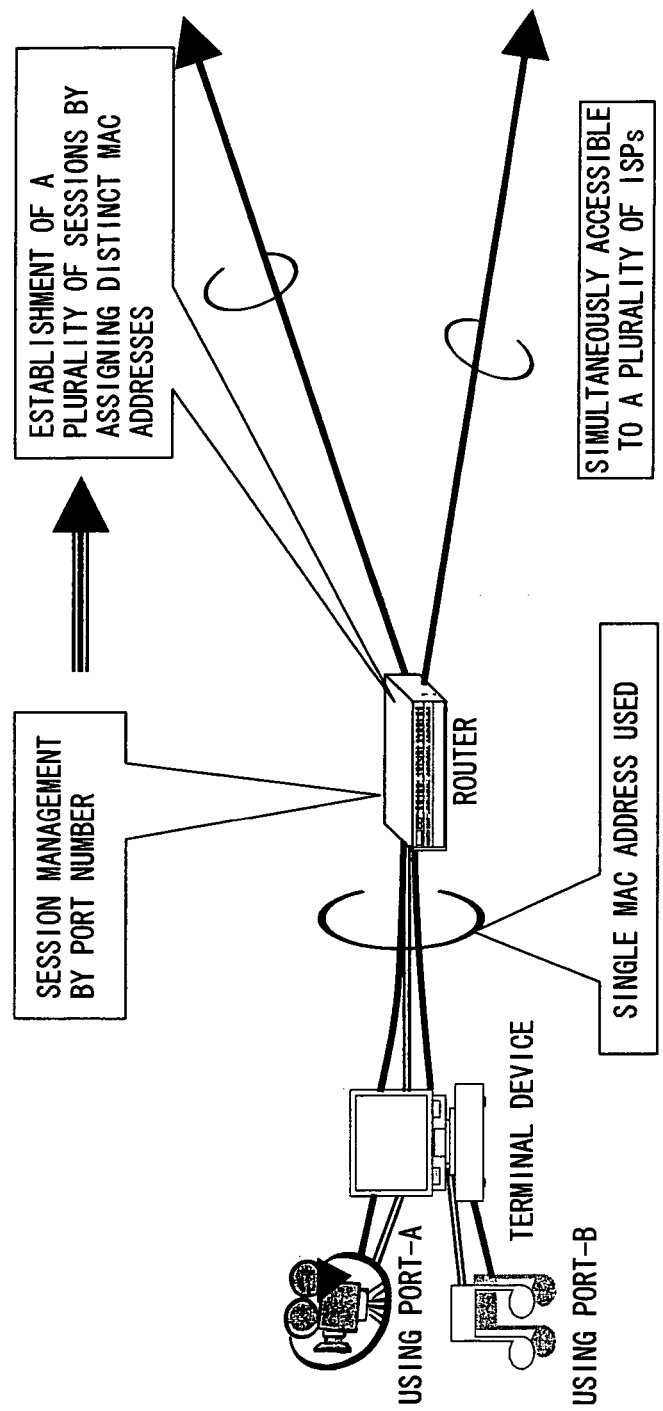
FIG. 22 shows another application example of the present invention.

FIG. 21 is an example of communication utilizing the communication device of the present invention.

Currently, a number of service providers are engaged in service providing contents over network, however in general, such services are provided only to the users, who established an account with the service provider. For that reason, the service providers are required to perform user authentication and to block inflow of packet from a non-contractual users and avoid delivery of data to the non-contractual users. For such user authentication, hence, introduction of the IEEE802.1x with fast processing speed and low device implementation cost is expected to proceed.

Meanwhile, terminal devices of users using the network generally comprises only a single network interface (i.e. physical port), and are connected to the network through the network interface. However, in the IEEE802.1x authentication, as stated above, sessions are identified only by the source MAC address of a physical port or the frames. Therefore, in the past, users had not been able to receive a plurality of services provided by different service providers at the same time in the environment where the IEEE802.1x authentication is performed.

Then, in the present invention, a plurality of distinct MAC addresses are assigned to a network interface of a terminal device used by a user (hereinafter referred to as a user terminal), and functions are extended so that the plurality of MAC addresses can be selectively used when required. The authenticator system for authenticating the user, as shown in FIG. 14, performs the IEEE802.1x, which is in the public domain, individually to each of the source MAC address. That is, the authenticator system authenticates a plurality of interfaces, when authenticating the user terminal. As a result, a plurality of sessions corresponding to a plurality of the MAC addresses assigned to the user terminal can be established in parallel.

In the example in FIG. 21, "MAC address-A" and "MAC address-B" are assigned to the user terminal. The user terminal is connected to a service provider-A with a session identified by the "MAC address-A". In addition, s session identified by the "MAC address-B" is also established at the same time, and the user terminal is connected to a service provider-B with the session. In other words, multi-sessions are realized, and the user can receive different services from a plurality of service providers at the same time.

The above embodiments are based on the premise of a system in which the IEEE802.1x is used as a user authentication, however the present invention is not limited to the system. The present invention can be, at least, applied to terminal devices, which performs communication over a network in which sessions are identified based on a source address (especially source MAC address).

Also the present invention lends itself particularly well to user terminals comprising only a single network interface (physical port), however, it should not be construed as exclusion of application to terminal devices with a plurality of network interfaces.

Furthermore, in the above embodiments, the present invention is applied to a terminal device placed in a user's home etc., however it is not limited to such terminal device. The present invention can be, for example, applied to communication devices (e.g. router device) placed in a network or placed between communication devices.

According to the present invention, a communication device with only a single network interface can even perform communication using a plurality of sessions at the same time over a network identifying sessions based on source addresses.

What is claimed is:

1. A user terminal which performs communication over a network where a session is identified based on a source address set in a frame, comprising:
    a memory to store a session management table to manage a plurality of physical addresses assigned to the user terminal;
    a physical port to connect to the network;
    a plurality of logical ports each being assigned with a distinct address selected from the plurality of physical addresses; and
    a processor
        to transmit a frame including a session establishment request to an authenticator system provided on the network through said physical port and
        to set one of the plurality of physical addresses assigned to the user terminal to a source address of the frame including the session establishment request, the source address being free of assignment to any established session
        to receive a notification of success in an authentication from the authenticator system;
        to update the session management table to manage corresponding relations between a new session established by the success in the authentication and information for identifying the logical port assigned with the physical address included in the session establishment request; and
        to transmit another frame utilizing the new session through the logical port corresponding to the new session by referring to the session management table.
2. The user terminal according to claim 1, wherein said processor, when a session requested using the session establishment request is authorized by the authenticator system, to manage a communication condition specified in the session establishment request corresponding to the address set in the frame including the session establishment request.

3. The user terminal according to claim 2, wherein said processor is further configured to analyze contents of a transmission frame transmitted from the user terminal after the corresponding relations are stored in the session management table, and to search for a communication condition by referring to said session management table using a result of said analysis, to select an address corresponding to the search result; and to set the address selected as the source address of the transmission frame.

4. The user terminal according to claim 2, wherein a source IP address is used as the communication condition.

5. The user terminal according to claim 2, wherein a port number is used as the communication condition.

6. The user terminal according to claim 1, wherein each of the plurality of the addresses managed by said session management table is MAC address.

7. A user terminal which performs communication over a network where a session is identified based on a source address set in a frame, comprising:
a physical port coupled to the network;
a memory to store a session management table to manage corresponding relations between one of plurality of logical ports each being assigned with a distinct physical address and a source IP address specified in a session establishment request included in a frame transmitted by using the logical ports; and
a processor to detect the source IP address of a transmission frame, and to select a logical port corresponding to the detected source IP address, to set the physical address assigned to the logical port as the source address of the transmission frame, and to transmit the transmission frame to the network through the physical port.

8. A user terminal which performs communication over a network where a session is identified based on a source address set in a frame, comprising:
a physical port coupled to the network;
a memory to store a session management table to manage corresponding relations between one of a plurality of logical ports, each being assigned with a distinct physical address, and a port number specified in a session establishment request included in a frame transmitted by using the logical ports; and
a processor to detect the port number of a transmission frame, and to select a logical port corresponding to the detected port number, to set the physical address assigned to the selected logical port as the source address of the transmission frame, and to transmit the transmission frame to the network through the physical port.

9. The user terminal according to claim 7, wherein a distinct MAC address is assigned to each of the plurality of the logical ports.

10. The user terminal according to claim 8, wherein a distinct MAC address is assigned to each of the plurality of the logical ports.

* * * * *